United States Patent
Pai et al.

(10) Patent No.: US 10,860,153 B1
(45) Date of Patent: Dec. 8, 2020

(54) TOUCH PANEL STRUCTURE

(71) Applicants: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW);
Chun-Hao Huang, Taoyuan (TW)

(72) Inventors: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW);
Chun-Hao Huang, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/914,561

(22) Filed: Jun. 29, 2020

(51) Int. Cl.
*G06F 3/044* (2006.01)

(52) U.S. Cl.
CPC .................. *G06F 3/0444* (2019.05)

(58) Field of Classification Search
CPC .................................................. G06F 3/0444
See application file for complete search history.

(56) References Cited

U.S. PATENT DOCUMENTS

2015/0116252 A1* 4/2015 Park .................. G06F 3/044
 345/173
2017/0271421 A1* 9/2017 Jinbo .................. H01L 27/3258

* cited by examiner

*Primary Examiner* — Aneeta Yodichkas

(57) ABSTRACT

A touch panel includes a substrate, a touch sensor, a bezel layer, a signal wire layer and a protective layer, which are superposed in order. The touch sensor has sensing traces and a dummy pattern. A trace contact at an end of each sensing trace is located at a margin of the substrate. The bezel layer is provided with through holes corresponding to the trace contacts. The signal wire layer includes signal wires arranged in a range of the bezel layer. A signal contact at an end of each signal wire is located correspondingly to one of the through holes. The through holes are filled with conductive glue to electrically connect the signal contacts and the trace contacts. The conductive glue is made of opaque conductive material with a color which is substantially identical to the bezel layer.

9 Claims, 3 Drawing Sheets

TOUCH PANEL STRUCTURE

TECHNICAL FIELD

The invention relates to touch panels, particularly to touch panels which can improve the yield rate.

RELATED ART

A conventional touch panel which is mounted on a screen is primarily composed of a transparent substrate, a touch sensor and a signal wire layer. The touch sensor is usually made of a transparent indium tin oxide (ITO) conductive film. The touch sensor has sensing traces. The signal wire layer includes signal wires. As for the manufacture of the conventional touch panel, a periphery of the transparent substrate is provided with an opaque bezel first, then the touch sensor is mounted on the transparent substrate to extend contacts of the sensing traces into the periphery of the transparent substrate and to make the contacts superposed on the bezel, and finally the contacts are electrically connected with the signal wires of the signal wire layer.

Because thickness of the bezel is between few microns (μm) and tens of microns, a height difference between the bezel and the transparent substrate is formed. The contacts of the sensing traces extended to the periphery of the bezel will form a steep height difference. Also, the ITO conductive film is very thin and fragile and possesses low ductility, so such a height difference is easy to cause fracture of the ITO conductive film. Such fracture will result in open-circuit and lowering of the yield rate of the touch panels.

SUMMARY OF THE INVENTION

An object of the invention is to provide a touch panel structure, which can prevent the ITO conductive layer from being bent and damaged and improve the yield rate.

To accomplish the above object, the touch panel structure of the invention includes a substrate, a touch sensor, a bezel layer, a signal wire layer and a protective layer. The touch sensor has sensing traces and a dummy pattern. An end of each sensing trace is provided with a trace contact located at a marginal portion of the substrate. The bezel layer is superposed on a peripheral area of the touch sensor and provided with through holes corresponding to the trace contacts. The signal wire layer is superposed on the bezel layer and includes signal wires arranged in a range of the bezel layer. An end of each signal wire is provided with a signal contact located at a position corresponding to one of the through holes. The protective layer is mounted on the signal wire layer. The through holes between the signal contacts and the trace contacts are filled with conductive glue to make the signal contacts and the trace contacts electrically connected. The conductive glue is made of opaque conductive material with a color which is substantially identical to the bezel layer.

Preferably, the touch panel structure of claim 1, wherein the conductive film is made of indium tin oxide (ITO), indium zinc oxide (IZO), zinc aluminum oxide (AZO), tin antimony oxide (ATO) or polyethylenedioxythiophene (PEDOT).

Preferably, the micro-blocks are hexagons, triangles, rectangles, trapezoids or circles in shape or a combination of two or more of said shapes.

Preferably, the first insulative material is insulative ink, photoresist or polyester resin and a cross-section of each of the through holes is of a conic shape.

Preferably, the signal wire layer is made of gold, silver, copper, aluminum, molybdenum, nickel or an alloy thereof, and the signal wire layer is silver paste printing lines.

Preferably, the second insulative material is optically clear adhesive (OCA), insulating ink, photoresist, polyester resin, siloxane, epoxy resin or acrylic resin.

DETAILED DESCRIPTION OF THE INVENTION

Figure 1:
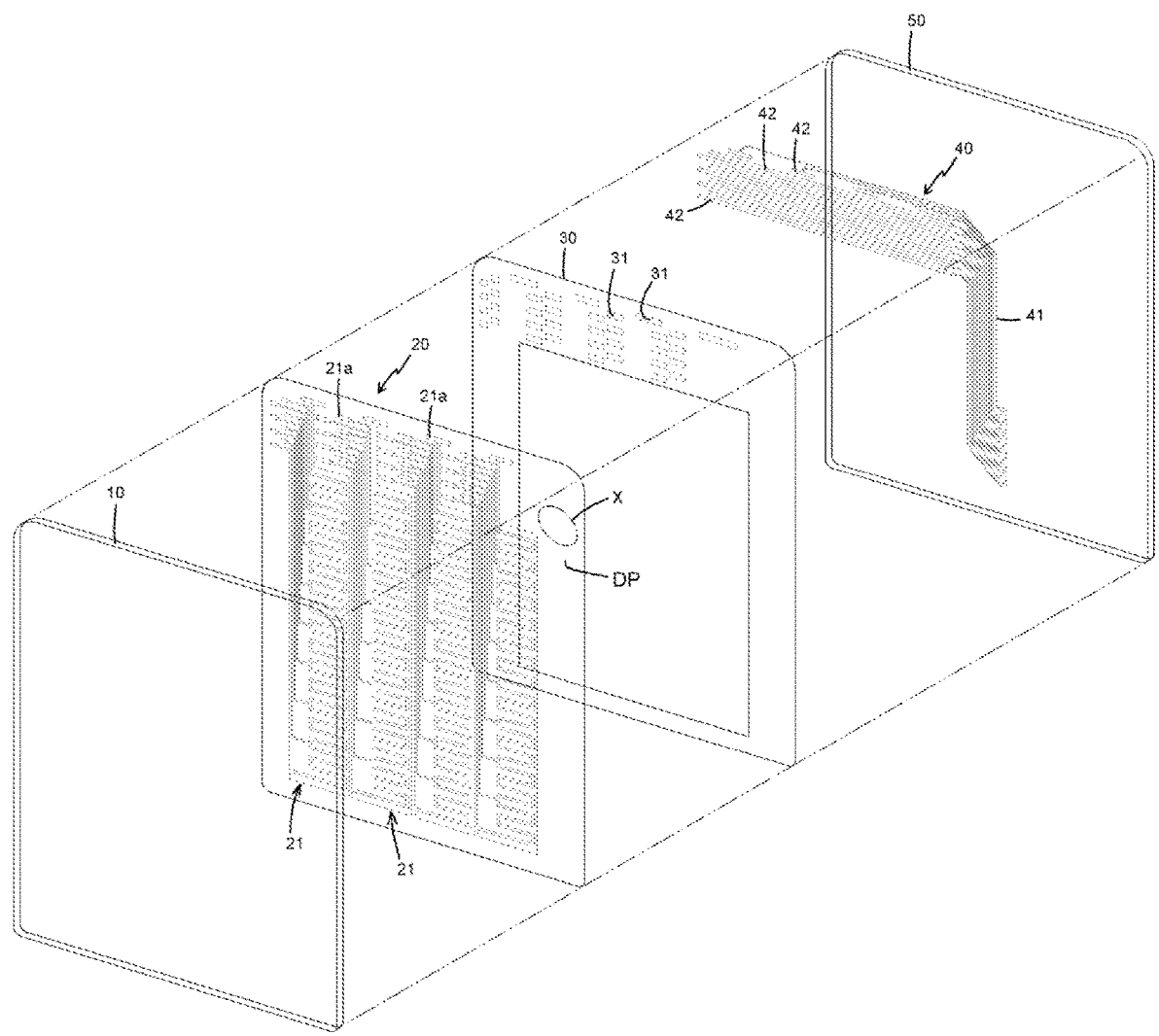
FIG. 1 is an exploded view of the invention.
Figure 2:
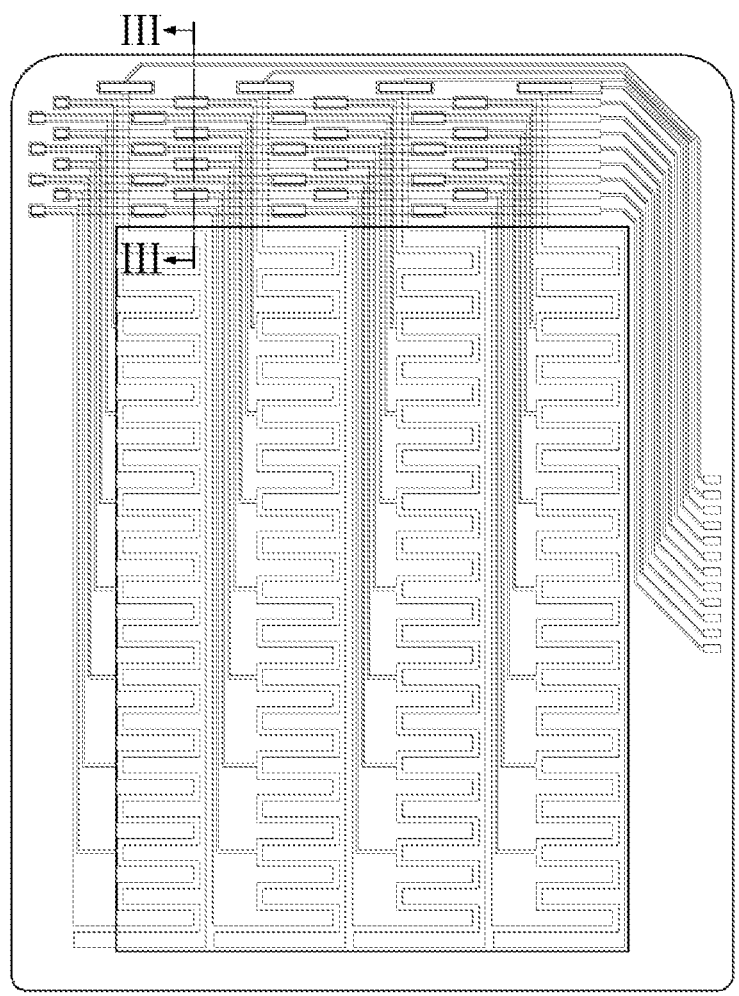
FIG. 2 is an assembled plan view of the invention.
Figure 3:
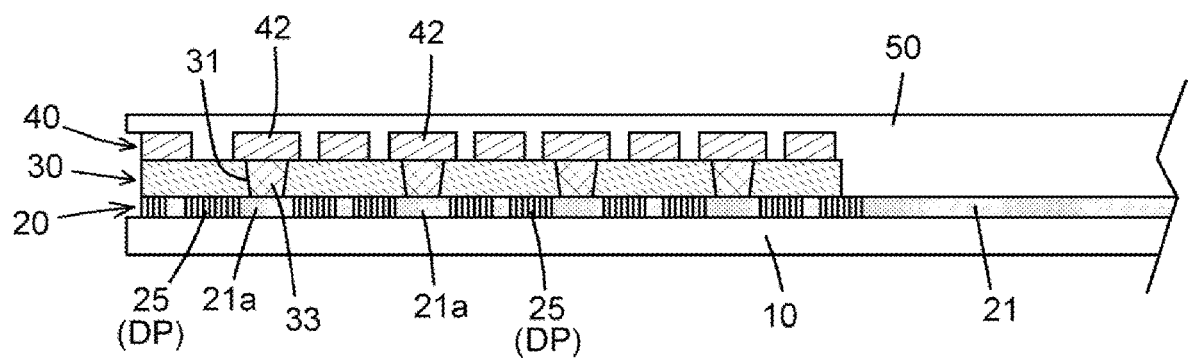
FIG. 3 is a cross-sectional view along line III-III in FIG. 2.

Please refer to FIGS. 1-3. A preferred embodiment of the touch panel structure of the invention includes a substrate 10, a touch sensor 20, a bezel layer 30, a signal wire layer 40 and a protective layer 50.

The substrate 10 is a thin board with great mechanic strength and high transmittance, which is made of, but not limited to, polycarbonate (PC), polyester (PET), polymethyl methacrylate (PMMA) or cycloolefin copolymer (COC). Other flexible or rigid transparent materials are available.

The substrate 10 also serves as a cover lens of the touch panel structure.

The touch sensor 20 is disposed on a surface of the substrate 10. This embodiment is based on a capacitive touch sensor with a single-layered framework as an example. As shown in FIG. 1, the touch sensor 20 is made of a conductive film with high transmittance, such as indium tin oxide (ITO).

Figure 4:
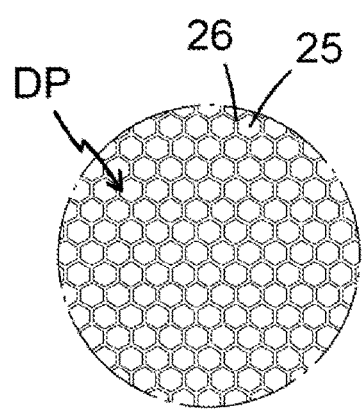
FIG. 4 is an enlarged view of portion X in FIG. 1, which depicts distribution of the micro-blocks of the dummy pattern.

The conductive film has sensing traces 21. An end of each sensing trace 21 is provided with a trace contact 21a. The trace contacts 21a are located at a marginal portion of the substrate 10. A dummy pattern DP is disposed on the conductive film. The dummy pattern DP is disposed on all of the conductive film except the sensing traces 21. As shown in FIG. 4, the dummy pattern DP is composed of unconnected micro-blocks 25. Every adjacent two of the micro-blocks 25 are insulatively separated by a gap 26. Preferably, the gap 26 is greater than 25 μm in width to guarantee enough insulation. The micro-blocks 25 may be, but not limited to, hexagons, triangles, rectangles, trapezoids, circles or combinations of two or more of these shapes. The dummy pattern DP can improve both uniformization of transmittance of the conductive layer and visibility of the touch sensor 20.

The bezel layer 30 is an opaque insulative layer and made of one or more laminated insulative materials such as insulative ink or photoresist. The bezel layer 30 is superposed on a peripheral area of the touch sensor 20 and provided with through holes 31 corresponding to the trace contacts 21a. Preferably, a cross-section of the through hole 31 is of a conic shape with a wider upper opening for being advantageous to filling conductive glue.

The signal wire layer 40 is made of conductive material with low impedance, such as copper. The signal wire layer 40 is superposed on the bezel layer 30 and includes signal wires 41 arranged in a range of the bezel layer 30. An end of each signal wire 41 is provided with a signal contact 42 located at a position corresponding to one of the through holes 31. As shown in FIG. 3, the through holes 31 between the signal contacts 42 and the trace contacts 21a are filled with conductive glue 33, such as UV-hardening conductive glue, to make the signal contacts 42 and the trace contacts 21a electrically connected. Preferably, the conductive glue 33 is made of opaque conductive material with a color which is substantially similar or identical to that of the bezel layer 30 because a color difference of material will adversely affect the appearance of the bezel layer 30.

The protective layer 50 is made of insulative material such as positive photosensitive siloxane material. The protective layer 50 is mounted on the signal wire layer 40 and the touch sensor 20. The protective layer 50 may adopt opaque insulative material such as insulative ink or photoresist and only covers the signal wire layer 40 for protection.

According to the invention, the ITO conductive layer of the touch sensor 20 is flatly disposed on the substrate 10, and then the trace contacts 21a of the touch sensor 20 are electrically connected with the signal contacts 42 of the signal wire layer 40 by the through holes 31 of the bezel layer 30. As a result, the ITO conductive layer is not bent and can avoid being broken.

It will be appreciated by persons skilled in the art that the above embodiment has been described by way of example only and not in any limitative sense, and that various alterations and modifications are possible without departure from the scope of the invention as defined by the appended claims.

What is claimed is:

1. A touch panel structure comprising:
   a substrate, being a transparent insulative plate;
   a touch sensor, disposed on the substrate, made of a transparent conductive film, the conductive film being provided with sensing traces and a dummy pattern, an end of each sensing trace being provided with a trace contact located at a marginal portion of the substrate, the dummy pattern being disposed on all of the conductive film except the sensing traces, the dummy pattern being composed of unconnected micro-blocks, and every adjacent two of the micro-blocks being insulatively separated by a gap;
   a bezel layer, being an opaque insulative layer, superposed on a peripheral area of the touch sensor, provided with through holes corresponding to the trace contacts, and made of one or more laminated first insulative materials;
   a signal wire layer, superposed on the bezel layer, comprising signal wires arranged in a range of the bezel layer, and an end of each signal wire being provided with a signal contact located at a position corresponding to one of the through holes; and
   a protective layer, made of a second insulative material, and mounted on the signal wire layer, wherein the through holes between the signal contacts and the trace contacts are filled with conductive glue to make the signal contacts and the trace contacts electrically connected, and the conductive glue is made of opaque conductive material with a color which is substantially identical to the bezel layer.

2. The touch panel structure of claim 1, wherein the conductive film is made of indium tin oxide, indium zinc oxide, zinc aluminum oxide, tin antimony oxide or polyethylenedioxythiophene.

3. The touch panel structure of claim 1, wherein the micro-blocks are hexagons, triangles, rectangles, trapezoids or circles in shape.

4. The touch panel structure of claim 3, wherein the micro-blocks comprises two or more of said shapes.

5. The touch panel structure of claim 1, wherein the first insulative material is insulative ink, photoresist or polyester resin.

6. The touch panel structure of claim 1, wherein a cross-section of each of the through holes is of a conic shape.

7. The touch panel structure of claim 1, wherein the signal wire layer is made of gold, silver, copper, aluminum, molybdenum, nickel or an alloy thereof.

8. The touch panel structure of claim 1, wherein the signal wire layer is silver paste printing lines.

9. The touch panel structure of claim 1, wherein the second insulative material is optically clear adhesive, insulating ink, photoresist, polyester resin, siloxane, epoxy resin or acrylic resin.

* * * * *